US009331910B2

(12) United States Patent
Dutt et al.

(10) Patent No.: US 9,331,910 B2
(45) Date of Patent: May 3, 2016

(54) METHODS AND SYSTEMS FOR AUTOMATIC GENERATION OF ROUTING CONFIGURATION FILES

(71) Applicant: Cumulus Networks, Inc., Sunnyvale, CA (US)

(72) Inventors: Dinesh Dutt, Sunnyvale, CA (US); Pradosh Mohapatra, Fremont, CA (US); John Paul Rivers, Saratoga, CA (US)

(73) Assignee: CUMULUS NETWORKS, INC., Mountain View, CA (US)

( * ) Notice: Subject to any disclaimer, the term of this patent is extended or adjusted under 35 U.S.C. 154(b) by 60 days.

(21) Appl. No.: 13/921,206

(22) Filed: Jun. 19, 2013

(65) Prior Publication Data
US 2014/0376402 A1 Dec. 25, 2014

(51) Int. Cl.
*H04L 12/24* (2006.01)

(52) U.S. Cl.
CPC ............ *H04L 41/12* (2013.01); *H04L 41/0843* (2013.01); *H04L 12/2425* (2013.01); *H04L 12/2483* (2013.01); *H04L 41/08* (2013.01); *H04L 41/0803* (2013.01); *H04L 41/0806* (2013.01); *H04L 41/5054* (2013.01)

(58) Field of Classification Search
None
See application file for complete search history.

(56) References Cited

U.S. PATENT DOCUMENTS

| | | | | |
|---|---|---|---|---|
| 6,587,874 B1 * | 7/2003 | Golla et al. | | 709/220 |
| 7,523,185 B1 * | 4/2009 | Ng | | G06F 15/173 370/395.2 |
| 7,603,445 B1 * | 10/2009 | Fehrle | | G06F 9/44505 370/254 |
| 7,865,577 B1 * | 1/2011 | O'Neil | | H04L 41/0809 709/220 |
| 8,122,110 B1 * | 2/2012 | Wilbur et al. | | 709/221 |
| 8,213,453 B1 * | 7/2012 | Voruganti | | H04L 47/32 370/235 |
| 8,335,171 B1 * | 12/2012 | Purkayastha | | H04L 41/0856 370/254 |
| 2002/0126642 A1 * | 9/2002 | Shitama | | 370/338 |
| 2002/0165961 A1 * | 11/2002 | Everdell | | H04L 41/22 709/225 |
| 2002/0194497 A1 * | 12/2002 | McGuire | | H04L 63/20 726/11 |
| 2005/0015777 A1 * | 1/2005 | Liss | | H04L 41/06 719/318 |
| 2005/0076144 A1 * | 4/2005 | Boylan | | H04L 29/12283 709/245 |
| 2005/0198247 A1 * | 9/2005 | Perry | | H04L 7/0008 709/223 |
| 2005/0240990 A1 * | 10/2005 | Trutner | | H04L 63/0227 726/11 |
| 2007/0230367 A1 * | 10/2007 | Chitale | | H04L 41/12 370/254 |

(Continued)

OTHER PUBLICATIONS

D'Ltri, "RPSL and rpsltool: Automatic generation of BGP configurations and filters", Trex Workshop 2012 PPT (Sep. 14, 2012), 28 pgs.

(Continued)

*Primary Examiner* — Faruk Hamza
*Assistant Examiner* — Andrew Oh
(74) *Attorney, Agent, or Firm* — Ascenda Law Group, PC

(57) ABSTRACT

Described herein are methods and systems for automatically generating routing configuration files based on a network topology and a collection of routing configuration templates. Such automatically generated routing configuration files may be suitable for a network running one or more of the RIP, EIGRP, OSPF, IS-IS and BGP routing protocols. The network topology may be specified in a graph description language, such as DOT, and/or a graph modeling language, such as GraphML. The routing configuration templates include certain routing protocol commands or sequence of commands that are frequently repeated in the configuration of a network device. Based on the network topology, the routing configuration templates are instantiated in a certain fashion, and any placeholders therein are replaced with information specific to the network topology.

16 Claims, 7 Drawing Sheets

| | | BGP | OSPF |
|---|---|---|---|
| Leaf | Node template | router bgp <AS number><br>bgp router-id <id><br>neighbor spines peer-group<br>neighbor spines remote-as <AS number><br>neighbor spines next-hop-self | router ospf<br>router-id <id> |
| | Interface template | neighbor interface <any> peer-group spines | interface <any><br>ip ospf area <clusterid> |
| | Prefix origination template | network interface <host-any> | network interface <host-any> area <clusterid> |
| Mid-spine | Node template | router bgp <AS number><br>bgp router-id <id><br>neighbor tors peer-group<br>neighbor tors remote-as <AS number><br>neighbor tors route-reflector-client<br>neighbor tors next-hop-self<br>neighbor spines peer-group<br>neighbor spines remote-as <AS number><br>neighbor spines next-hop-self | router ospf<br>router-id <id> |
| | Interface template | neighbor interface <leaf-layer> peer-group tors<br>neighbor interface <spine-layer> peer-group spines | interface <to-leaf><br>ip ospf area <clusterid><br>interface <to-top-spine><br>ip ospf area 0.0.0.0 |
| Top-spine | Node template | router bgp <AS number><br>bgp router-id <id><br>neighbor spines peer-group<br>neighbor spines remote-as <AS number><br>neighbor spines next-hop-self | router ospf<br>router-id <id> |
| | Interface template | neighbor interface <any> peer-group spines | interface <any><br>ip ospf area 0.0.0.0 |

(56) References Cited

U.S. PATENT DOCUMENTS

| | | | |
|---|---|---|---|
| 2009/0043912 A1* | 2/2009 | Archer | H04L 45/02 709/242 |
| 2009/0198707 A1* | 8/2009 | Rohner | H04L 63/1408 |
| 2010/0042708 A1* | 2/2010 | Stamler et al. | 709/221 |
| 2010/0054156 A1* | 3/2010 | DeHaan | 370/255 |
| 2010/0061242 A1* | 3/2010 | Sindhu | H04L 41/0806 370/235 |
| 2010/0150025 A1* | 6/2010 | Oman | H04L 41/0843 370/254 |
| 2010/0165877 A1* | 7/2010 | Shukla | H04L 41/0843 370/254 |
| 2010/0208615 A1* | 8/2010 | Soon et al. | 370/254 |
| 2010/0268803 A1* | 10/2010 | Calippee | H04L 41/0843 709/221 |
| 2010/0299414 A1* | 11/2010 | Nyman | H04L 29/1282 709/220 |
| 2011/0087757 A1* | 4/2011 | Paalanen | H04L 41/082 709/219 |
| 2013/0132850 A1* | 5/2013 | Subramanian | H04L 41/12 715/735 |
| 2013/0254405 A1* | 9/2013 | Nadaf | H04L 41/0823 709/226 |
| 2013/0332996 A1* | 12/2013 | Fiala | G06F 21/53 726/4 |
| 2014/0153437 A1* | 6/2014 | Tracy | H04L 45/16 370/254 |
| 2014/0241205 A1* | 8/2014 | Virk et al. | 370/254 |
| 2014/0280801 A1* | 9/2014 | Cardona | H04L 47/127 709/221 |

OTHER PUBLICATIONS

Lapukhov; et al., "Using BGP for routing in large-scale data centers", IDR (Aug. 10, 2012), 10 pgs.

* cited by examiner

```
Network definition for XXX digraph G {
    r1 [layer="leaf", id="0.0.0.1"];
    r2 [layer="leaf", id="0.0.0.2"];
    r3 [layer="midsp", id="0.0.0.3"];
    r4 [layer="midsp", id="0.0.0.4"];
    r5 [layer="leaf", id="0.0.0.5"];
    r6 [layer="leaf", id="0.0.0.6"];
    r7 [layer="midsp", id="0.0.0.7"];
    r8 [layer="midsp", id="0.0.0.8"];
    r9 [layer="topsp", id="0.0.0.9"];
    r10 [layer="topsp", id="0.0.0.10"];
    r1:swp1 -> r3:swp1;
    r1:swp2 -> r4:swp1;
    r2:swp1 -> r3:swp2;
    r2:swp2 -> r4:swp2;
    r3:swp3 -> r9:swp1;
    r3:swp4 -> r10:swp1;
    r4:swp3 -> r9:swp2;
    r4:swp4 -> r10:swp2;
    r5:swp1 -> r7:swp1;
    r5:swp2 -> r8:swp1;
    r6:swp1 -> r7:swp2;
    r6:swp2 -> r8:swp2;
    r7:swp3 -> r9:swp3;
    r7:swp4 -> r10:swp3;
    r8:swp3 -> r9:swp4;
    r8:swp4 -> r10:swp4;
    r1:swp10 -> h1:eth0;
    protocol ["BGP"]
    subgraph pod1 {
        clusterid="1.1.1.1"; r1; r2; r3; r4;
    }
    subgraph pod2 {
        clusterid="2.2.2.2"; r5; r6; r7; r8;
    }
}
```

Fig. 2

| | | BGP | OSPF |
|---|---|---|---|
| Leaf | Node template | router bgp <AS number><br>bgp router-id <id><br>neighbor spines peer-group<br>neighbor spines remote-as <AS number><br>neighbor spines next-hop-self | router ospf<br>router-id <id> |
| | Interface template | neighbor interface <any> peer-group spines | interface <any><br>ip ospf area <clusterid> |
| | Prefix origination template | network interface <host-any> | network interface <host-any> area <clusterid> |
| Mid-spine | Node template | router bgp <AS number><br>bgp router-id <id><br>neighbor tors peer-group<br>neighbor tors remote-as <AS number><br>neighbor tors route-reflector-client<br>neighbor tors next-hop-self<br>neighbor spines peer-group<br>neighbor spines remote-as <AS number><br>neighbor spines next-hop-self | router ospf<br>router-id <id> |
| | Interface template | neighbor interface <leaf-layer> peer-group tors<br>neighbor interface <spine-layer> peer-group spines | interface <to-leaf><br>ip ospf area <clusterid><br>interface <to-top-spine><br>ip ospf area 0.0.0.0 |
| Top-spine | Node template | router bgp <AS number><br>bgp router-id <id><br>neighbor spines peer-group<br>neighbor spines remote-as <AS number><br>neighbor spines next-hop-self | router ospf<br>router-id <id> |
| | Interface template | neighbor interface <any> peer-group spines | interface <any><br>ip ospf area 0.0.0.0 |

Fig. 4

| | BGP | OSPF |
|---|---|---|
| r1 | router bgp 65000<br>bgp router-id 0.0.0.1<br>neighbor spines peer-group<br>neighbor spines remote-as 65000<br>neighbor spines next-hop-self<br>neighbor interface swp1 ipv6 peer-group spines<br>neighbor interface swp2 ipv6 peer-group spines<br>network interface swp10 ipv6 | router ospf<br>router-id 0.0.0.1<br>interface swp1<br>ip ospf area 1.1.1.1<br>interface swp2<br>ip ospf area 1.1.1.1<br>network interface swp10 ipv6 area 1.1.1.1 |
| r3 | router bgp 65000<br>bgp router-id 0.0.0.3<br>neighbor tors peer-group<br>neighbor tors remote-as 65000<br>neighbor tors route-reflector-client<br>neighbor tors next-hop-self<br>neighbor spines peer-group<br>neighbor spines remote-as 65000<br>neighbor spines next-hop-self<br>neighbor interface swp1 ipv6 peer-group tors<br>neighbor interface swp2 ipv6 peer-group tors<br>neighbor interface swp3 ipv6 peer-group spines<br>neighbor interface swp4 ipv6 peer-group spines | router ospf<br>router-id 0.0.0.3<br>interface swp1<br>ip ospf area 1.1.1.1<br>interface swp2<br>ip ospf area 1.1.1.1<br>interface swp3<br>ip ospf area 0.0.0.0<br>interface swp4<br>ip ospf area 0.0.0.0 |
| r9 | router bgp 65000<br>bgp router-id 0.0.0.9<br>neighbor spines peer-group<br>neighbor spines remote-as 65000<br>neighbor spines next-hop-self<br>neighbor interface swp1 ipv6 peer-group spines<br>neighbor interface swp2 ipv6 peer-group spines<br>neighbor interface swp3 ipv6 peer-group spines<br>neighbor interface swp4 ipv6 peer-group spines | router ospf<br>router-id 0.0.0.9<br>interface swp1<br>ip ospf area 0.0.0.0<br>interface swp2<br>ip ospf area 0.0.0.0<br>interface swp3<br>ip ospf area 0.0.0.0<br>interface swp4<br>ip ospf area 0.0.0.0 |

Fig. 5

METHODS AND SYSTEMS FOR AUTOMATIC GENERATION OF ROUTING CONFIGURATION FILES

FIELD OF THE INVENTION

The present invention relates to methods and systems for automatically generating routing configuration files, and more particularly relates to automatically generating routing configuration files based on a network topology and a collection of routing configuration templates.

BACKGROUND

In a typical communication network, a source and destination are separated by a plurality of intermediary devices, such as routers, bridges, gateways, firewalls and switches. Network routing involves, among other things, selecting a route (often the most optimal route according to some metric, such as latency etc.) from the source to the destination through the intermediary devices. Before routes can be selected, the intermediary devices need to be configured. In some cases, configuring the intermediary devices involves specifying the directly connected neighbor devices of each intermediary device, specifying the group membership of an intermediary device (e.g., membership in an Autonomous System, peer group, confederation, etc.), specifying whether routing tables should be forwarded to other devices (e.g., route reflectors).

Routing protocols have been developed to facilitate the configuration of the intermediary devices. Example routing protocols include the Routing Information Protocol (RIP), the Enhanced Interior Gateway Routing Protocol (EIGRP), the Open Shortest Path First (OSPF) protocol, Intermediate System to Intermediate System (IS-IS) protocol and the Border Gateway Protocol (BGP). While routing protocols facilitate the configuration of intermediary devices, in most cases, such configuration is not automatic, and requires a significant amount of a network operator's attention. In fact, Cisco Systems™ of San Jose, Calif. has developed the Networking Academy Program to train individuals to properly configure routing protocols such as RIP, EIGRP, OSPF, IS-IS and BGP. Highly trained network operators are necessary, as configuration errors can lead to network system failure and consequently a loss of productivity at an enterprise.

One approach to address routing configuration errors, specifically cabling errors, has been to verify the cabling dynamically at link-up. The prescribed topology of the network specified in a graph description language such as DOT is compared with the actual topology of the network, determined via a discovery protocol such as the link layer discovery protocol (LLDP). Differences between the prescribed topology and the actual topology may include missing cabling in the actual topology (e.g., in the event that cable is damaged or misconnected), or may include an extra cable in the actual topology (e.g., in the event that cable is misconnected). Any differences may be logged for analysis by a network operator. While verifying the cabling dynamically at link-up helps address cabling errors, other types of routing configuration errors remain.

SUMMARY OF THE INVENTION

In various embodiments of the present invention, a routing configuration file generator automatically generates configuration files for configuring a network device (e.g., router, switch) in accordance with a routing protocol (e.g., RIP, EIGRP, OSPF, IS-IS and BGP). Since the generation of a configuration file is an automated process, configuration errors by network operators are significantly reduced. Further, time spent by network operators to configure and troubleshoot network devices is significantly reduced, freeing up network operators for other tasks.

In one embodiment of the invention, the routing configuration file generator receives as input a network topology specified in a graph description language, such as DOT, and/or in a graph modeling language, such as GraphML. A network topology may also be specified as a network diagram, in which case, the network diagram may be first converted into a DOT or GraphML file, before being provided to the routing configuration file generator.

In one embodiment of the invention, the routing configuration file generator also receives as input routing configuration templates, which include certain sequences of routing protocol commands that are frequently repeated in the configuration of a network device. The routing configuration file templates may include placeholders for information specific to a certain network configuration. Such information may include identifiers associated with nodes (i.e., node is another name for a network device or an intermediary device), identifiers associated with interfaces of a node, identifiers associated with a group of nodes, etc. A different template may be provided for different types of nodes, such as a leaf node, mid-spine node, and top-spine node. Further, a template may be provided for different node interfaces, such as an interface that is communicatively coupled to a leaf node, an interface that is communicatively coupled to a spine node, etc.

In one embodiment of the invention, the routing configuration file generator also receives as input the routing protocol for the network (e.g., RIP, EIGRP, OSPF, IS-IS and BGP). The routing protocol may be received as part of the DOT or GraphML file.

In one embodiment of the invention, the routing configuration file generator also receives as input neighbor addresses associated with the nodes. In one embodiment of the invention, link local addresses are automatically generated for node neighbors, eliminating the need to acquire Internet Protocol (IP) addresses associated with the node neighbors.

Based on one or more of the above-described input, the routing configuration file generator automatically generates a routing configuration file for one or more nodes of the network. In one embodiment of the invention, the routing configuration file generator may instantiate a particular template for each node of the network topology, substituting any placeholders with information specific to the network topology. Further, the routing configuration file generator may instantiate a particular template for each node interface of the network topology, substituting any placeholders with information specific to the network topology.

These and other embodiments of the invention are more fully described in association with the drawings below.

BRIEF DESCRIPTION OF THE DRAWINGS

The present invention is illustrated by way of example, and not limitation, in the figures of the accompanying drawings in which:

FIG. 2 depicts an exemplary DOT file, in accordance with one embodiment of the invention;

FIG. 4 depicts exemplary configuration file templates, in accordance with one embodiment of the invention;

FIG. 5 depicts exemplary output of the routing configuration file generator, in accordance with one embodiment of the invention;

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
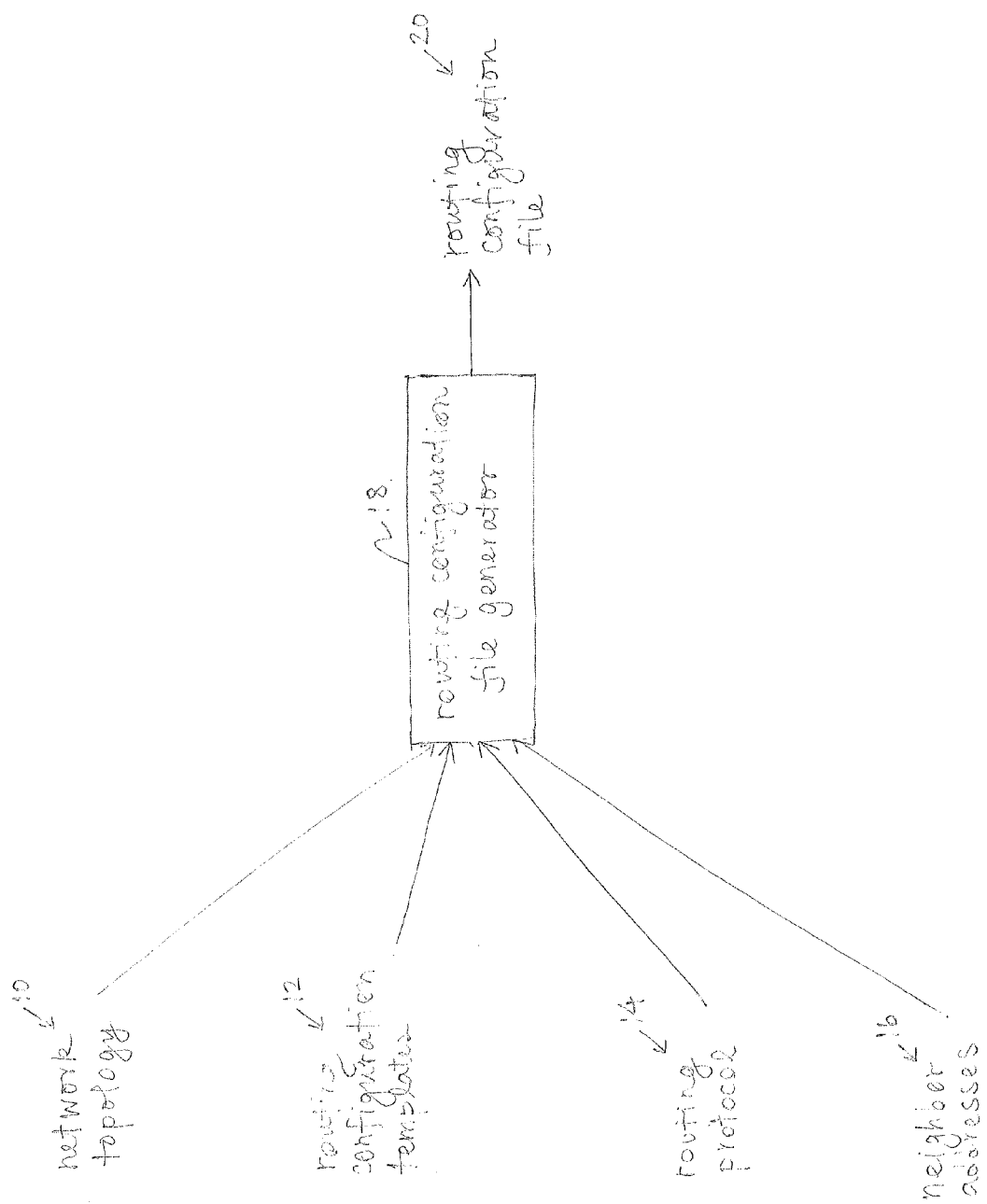
FIG. 1 depicts a signal flow diagram, in accordance with one embodiment of the invention.

FIG. 1 depicts a signal flow diagram of one embodiment of the present invention. At the heart of the signal flow diagram is routing configuration file generator 18, which takes as input network topology 10, routing configuration templates 12, routing protocol 14 and neighbor addresses 16, and produces as output a routing configuration file 20. Each of these components is described in more detail below.

Network topology 10 specifies the interconnection between nodes of the network. Nodes may include the above-mentioned intermediary devices (e.g., routers, bridges, gateways, firewalls and switches). Each node may have one or more interfaces. More specifically, network topology 10 may specify the interconnection between interfaces of the nodes. The interconnection may be a directional connection or a bi-directional connection between two interfaces. Example network topologies include a Clos topology, a folded Clos topology (i.e., a "fat tree") and a leaf and spine network.

In one embodiment of the invention, network topology 10 may be specified using a graph description language, such as DOT, and/or a graph modeling language, such as GraphML. Alternatively, network topology 10 may be specified by a network diagram, such as that depicted in FIG. 3, and a DOT file or GraphML file may be automatically generated from the network diagram.

Figure 3:
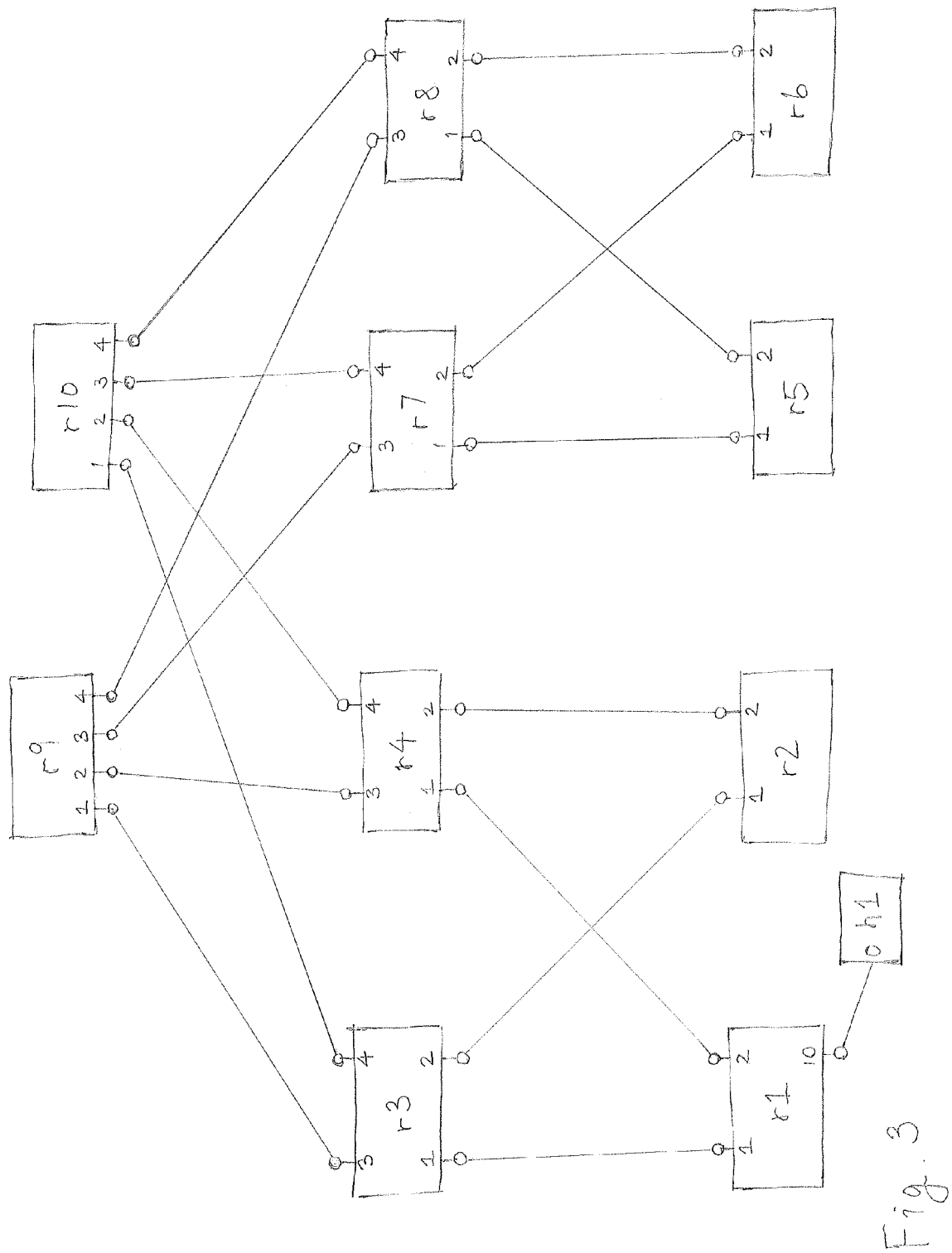
FIG. 3 depicts an exemplary network diagram, in accordance with one embodiment of the invention.

An exemplary DOT file is depicted in FIG. 2, the DOT file describing the network topology of FIG. 3. In the DOT file, eleven nodes are present, and have been assigned the internal identifiers r1 through r10 and h1, such identifiers used within the DOT file to identify the nodes. The nodes r1 through r10 may represent routers, switches, gateways, etc., while node h1 may represent a host or server.

The nodes may be assigned certain attributes, such as a layer attribute. In the example of FIG. 2, nodes r1, r2, r5 and r6 have been assigned the attribute of layer="leaf". More generally, "leaf" may be the name of an input/output stage (e.g., Tier 2 stage) of a Clos topology. In the example of FIG. 2, nodes r3, r4, r7 and r8 have been assigned the attribute of layer="midsp", an abbreviation for mid-spine. In the example of FIG. 2, nodes r9 and r10 have been assigned the attribute of layer="topsp", an abbreviation for top-spine. More generally, "spine" (including mid-spine and top-spine) may be the name of a middle stage (e.g., Tier 1 stage) of a Clos topology.

Each node may be assigned an external identifier, such identifier used to identify a node in a routing configuration file. In the example of FIG. 2, nodes r1 through r10 have been assigned external identifiers "0.0.0.1" through "0.0.0.10", respectively.

Interconnections between nodes (or more precisely between interfaces of the nodes) are further specified in the exemplary DOT file. For instance, the statement "r1:swp1-> r3:swp1;" specifies that interface "swp1" of node "r1" is communicatively coupled to interface "swp1" of node "r3". Such arrangement may be more clearly understood from FIG. 3, which depicts interface "swp1" of node "r1" communicatively coupled to interface "swp1" of node "r3". For ease of illustration, interface "swp1" has been abbreviated as "1", interface "swp2" has been abbreviated as "2", and so on. Interface "eth0" has been abbreviated as "0". Other interconnections have been specified using the same syntax as described above, and should be readily understood by one of ordinary skill in the art without further explanation.

The DOT file may specify a type of routing protocol, such as BGP, OSPF, EIGRP, etc., for the network. The automatically generated routing configuration file (i.e., the output of the routing configuration file generator 18, further described below) will be generated in accordance with the specified routing protocol. In the exemplary DOT file of FIG. 2, the protocol has been specified as BGP.

The DOT file may also specify certain clusters of nodes. In the example of FIG. 2, nodes r1, r2, r3 and r4 have been aggregated into one cluster, having internal identifier "pod1" and external identifier "1.1.1.1". Likewise, nodes r5, r6, r7 and r8 have been aggregated into one cluster, having internal identifier "pod2" and external identifier "2.2.2.2".

In one embodiment of the invention, internal BGP (IBGP) may be used as the routing protocol inside a network with a topology such as leaf and spine. The template for IBGP can be described by the following method. The nodes above the leaf layer are configured to be route reflectors in their own cluster. They use the router-id as their cluster-id by default (no configuration needed). While reflecting routes from one layer to the next, these nodes set next-hop-self through configuration, thus inserting themselves into the data path. In the absence of an IGP cost in the network, the nodes use cluster-list length as a metric representation. This ensures loop-free forwarding and forms the basis for equal-cost multipath.

Routing configuration file generator 18 also takes as input routing configuration templates 12. A template generally captures one or more lines of configuration commands that repeat in a routing configuration file or across multiple routing configuration files (i.e., captures the basic repeating unit). A template further may include placeholders for information specific to a network topology, such as node identifiers, interface identifiers, etc.

FIG. 4 depicts routing configuration templates that may be used for BGP and OSPF. Such templates are exemplary in nature, and other templates may be used. While BGP and OSPF are discussed, it is understood that templates may be developed for other routing protocols, such as RIP, EIGRP and IS-IS.

In one embodiment of the present invention, different templates may be provided for different node types. In the example of FIG. 4, different templates have been provided for the node types, "leaf", "mid-spine", and "top-spine", corresponding to the DOT file layer attributes described above. Other node types may be defined by the user as desired. Further, a node template may be instantiated once per node, an interface template may be instantiated once per router facing interface, and a prefix-origination template may be instantiated once per host facing interface.

A discussion is now provided for the instantiation of the node and interface BGP templates associated with the "leaf" node r1. The following node template for a leaf node is instantiated once for node r1:

```
router bgp <AS number>
bgp router-id <id>
neighbor spines peer-group
neighbor spines remote-as <AS number>
neighbor spines next-hop-self
```

Any placeholders may be appropriately completed along with the instantiation of the template. For instance, the <AS number> placeholder may be specified as 65000. More generally, the <AS number> may be any Autonomous System (AS) number, while a private AS number may be a convenient choice. For node r1, the <id> placeholder may be specified as 0.0.0.1, in accordance with the external node identifier 0.0.0.1 being assigned to node r1 in the DOT file.

The following interface template for a "leaf" node is instantiated once per each router facing interface of r1:

neighbor interface <any> peer-group spines

For interface "swp1" of node "r1", the placeholder <any> may be replaced by the interface identifier "swp1", followed by the tag "ipv6" specifying that interface "swp1" uses ipv6 addressing. For interface "swp2" of node "r1", the placeholder <any> may be replaced by the interface identifier "swp2", followed by the tag "ipv6" specifying that interface "swp2" uses ipv6 addressing. Depending on the implementation of the network, interfaces "swp1" and "swp2" may use ipv4 addressing instead, in which case the tag "ipv4" is used. Whether an interface uses ipv6 or ipv4 addressing may be specified by the user via network topology 10 (or other user input, not depicted in FIG. 1).

The following interface template for a "leaf" node is instantiated once per each host facing interface of r1:

network interface <host-any>

For interface "swp10" (i.e., a host facing interface) of node "r1", the placeholder <host-any> may be replaced by the interface identifier "swp10", followed by the tag "ipv6" specifying that interface "swp10" uses ipv6 addressing. Depending on the implementation of the network, interface "swp10" may use ipv4 addressing instead, in which case the tag "ipv4" is used.

Assuming AS number 65000 is used, the following is an automatically generated configuration file for node r1:

```
router bgp 65000
bgp router-id 0.0.0.1
neighbor spines peer-group
neighbor spines remote-as 65000
neighbor spines next-hop-self
neighbor interface swp1 ipv6 peer-group spines
neighbor interface swp2 ipv6 peer-group spines
network interface swp10 ipv6
```

Next, a discussion is provided for the instantiation of the node and interface BGP templates associated with the "midsp" node r3. The following node template for a "midsp" node is instantiated once for node r3:

```
router bgp <AS number>
bgp router-id <id>
neighbor tors peer-group
neighbor tors remote-as <AS number>
neighbor tors route-reflector-client
neighbor tors next-hop-self
neighbor spines peer-group
neighbor spines remote-as <AS number>
neighbor spines next-hop-self
```

Any placeholders may be appropriately completed along with the instantiation of the template. For instance, the <AS number> placeholder may be specified as 65000. For node r3, the <id> placeholder may be specified as 0.0.0.3, in accordance with the external node identifier 0.0.0.3 being assigned to node r3 in the DOT file.

The interface template for a "midsp" node is instantiated once per node interface. For "midsp" nodes, there are two variations of the interface template. One variation is used if the node interface is communicatively coupled to a node that is a leaf node:

neighbor interface <leaf-layer> peer-group tors

Another variation is used if the node interface is communicatively coupled to a node that is a "spine" node (i.e., a "spine" node including a "midsp" and a "topsp" node):

neighbor interface <spine-layer> peer-group spines

As one example, since interface "swp1" of node "r3" is communicatively coupled to "leaf" node r1, the interface template corresponding to interface "swp1" of node "r3" is:

neighbor interface swp1 ipv6 peer-group tors where the placeholder <leaf-layer> has been replaced by the interface identifier "swp1" and a tag "ipv6" specifying that interface "swp1" uses ipv6 addressing. Depending on the implementation of the network, interface "swp1" may use ipv4 addressing instead.

As another example, since interface "swp3" of node "r3" is communicatively coupled to the "topsp" node r9, the interface template corresponding to interface "swp3" of node "r3" is:

neighbor interface swp3 ipv6 peer-group spines where the placeholder <spine-layer> has been replaced by the interface identifier "swp3" and a tag "ipv6" specifying that interface "swp3" uses ipv6 addressing. Depending on the implementation of the network, interface "swp3" may use ipv4 addressing instead.

Assuming ipv6 addressing and the AS number of 65000, the following is an automatically generated configuration file for node r3:

```
router bgp 65000
bgp router-id 0.0.0.3
neighbor tors peer-group
neighbor tors remote-as 65000
neighbor tors route-reflector-client
neighbor tors next-hop-self
neighbor spines peer-group
neighbor spines remote-as 65000
neighbor spines next-hop-self
neighbor interface swp1 ipv6 peer-group tors
neighbor interface swp2 ipv6 peer-group tors
neighbor interface swp3 ipv6 peer-group spines
neighbor interface swp4 ipv6 peer-group spines
```

Next, a discussion is provided for the instantiation of the node and interface BGP templates associated with the "topsp" node r9. The following node template for a "topsp" node is instantiated once for node r9:

```
router bgp <AS number>
bgp router-id <id>
neighbor spines peer-group
neighbor spines remote-as <AS number>
neighbor spines next-hop-self
```

Any placeholders may be appropriately completed along with the instantiation of the template. For instance, the <AS number> placeholder may be specified as 65000. For node r9, the <id> placeholder may be specified as 0.0.0.9, in accordance with the external node identifier 0.0.0.9 being assigned to node r9 in the DOT file.

The following interface template for a "topsp" node is instantiated once per node interface:

neighbor interface <any> peer-group spines

For interface "swp1" of node "r9", the placeholder <any> may be replaced by the interface identifier "swp1", followed by a tag "ipv6" specifying that interface "swp1" uses ipv6 addressing. Depending on the implementation of the network, interface "swp1" may use ipv4 addressing instead. The interface templates for other interfaces of node r9 may be completed in a similar manner. Assuming ipv6 addressing and the AS number of 65000, the following is an automatically generated configuration file for node r9:

```
router bgp 65000
    bgp router-id 0.0.0.9
    neighbor spines peer-group
    neighbor spines remote-as 65000
    neighbor spines next-hop-self
    neighbor interface swp1 ipv6 peer-group spines
    neighbor interface swp2 ipv6 peer-group spines
    neighbor interface swp3 ipv6 peer-group spines
    neighbor interface swp4 ipv6 peer-group spines
```

While the discussion above has focused on BGP templates, OSPF templates may alternatively be used.

A discussion is now provided for the instantiation of the node and interface OSPF templates associated with the "leaf" node r1. The following node template for a "leaf" node is instantiated once for node r1:

```
router ospf
    router-id <id>
```

Any placeholders may be appropriately completed along with the instantiation of the template. For node r1, the <id> placeholder may be specified as 0.0.0.1, in accordance with the external node identifier 0.0.0.1 being assigned to node r1 in the DOT file.

The following interface template for a "leaf" node is instantiated once per router facing interface of r1:

```
interface <any>
    ip ospf area <clusterid>
```

For interface "swp1" of node "r1", the placeholder <any> may be replaced by the interface identifier "swp1". The placeholder <clusterid> may be replaced by 1.1.1.1, since "swp1" of node "r1" is connected to port of "swp1" of node "r3", and node "r3" is in cluster 1.1.1.1. An interface template corresponding to interface "swp2" of node "r1" may be instantiated in a similar manner.

The following interface template for a "leaf" node is instantiated once per each host facing interface of r1:

Network interface <host-any> area <clusterid>

For interface "swp10" (i.e., a host facing interface) of node "r1", the placeholder <host-any> may be replaced by the interface identifier "swp10", followed by the tag "ipv6" specifying that interface "swp10" uses ipv6 addressing. Depending on the implementation of the network, interface "swp10" may use ipv4 addressing instead, in which case the tag "ipv4" is used. The placeholder <clusterid> may be replaced by the cluster corresponding to node "r1", which in this case is 1.1.1.1.

The following is the automatically generated configuration file for node r1:

```
router ospf
    router-id 0.0.0.1
    interface swp1
        ip ospf area 1.1.1.1
    interface swp2
        ip ospf area 1.1.1.1
    network interface swp10 ipv6 area 1.1.1.1
```

Next, a discussion is provided for the instantiation of the node and interface OSPF templates associated with the "midsp" node r3. The following node template for a "midsp" node is instantiated once for node r3:

```
router ospf
    router-id <id>
```

Any placeholders may be appropriately completed along with the instantiation of the template. For node r3, the <id> placeholder may be specified as 0.0.0.3, in accordance with the external node identifier 0.0.0.3 being assigned to node r3 in the DOT file.

The interface template for a "midsp" node will be instantiate once per node interface. For "midsp" nodes, there are two variations of the interface template. One variation is used if the node interface is communicatively coupled to a node that is a "leaf" node:

```
interface <to-leaf>
    ip ospf area <clusterid>
```

Another variation is used if the node interface is communicatively coupled to a node that is a "topsp" node:

```
interface <to-top-spine>
    ip ospf area 0.0.0.0
```

As one example, since interface "swp1" of node "r3" is communicatively coupled to "leaf" node r1, the template for interface "swp1" of node "r3" is:

```
interface swp1
    ip ospf area 1.1.1.1
``` where the placeholder <to-leaf > is replaced by the interface identifier "swp1", and the placeholder <clusterid> is replaced by 1.1.1.1, since "swp1" of node "r3" is connected to port of "swp1" of node "r1", and node "r1" is in cluster 1.1.1.1.

As another example, since interface "swp3" of node "r3" is communicatively coupled to the "topsp" node r9, the template for interface "swp3" of node "r3" is:

```
interface swp3
    ip ospf area 0.0.0.0
```

The following is an automatically generated configuration file for node r3:

```
router ospf
    router-id 0.0.0.3
    interface swp1
        ip ospf area 1.1.1.1
    interface swp2
        ip ospf area 1.1.1.1
    interface swp3
        ip ospf area 0.0.0.0
    interface swp4
        ip ospf area 0.0.0.0
```

Next, a discussion is provided for the instantiation of the node and interface OSPF templates associated with the "topsp" node r9. The following node template for a "topsp" node is instantiated once for node r9:

```
router ospf
    router-id <id>
```

Any placeholders may be appropriately completed along with the instantiation of the template. For node r9, the <id> placeholder may be specified as 0.0.0.9, in accordance with the external node identifier 0.0.0.9 being assigned to node r9 in the DOT file.

The following interface template for a "topsp" node is instantiated once per node interface:

```
interface <any>
    ip ospf area 0.0.0.0
```

For interface "swp1" of node "r9", the placeholder <any> may be replaced by interface identifier "swp1". Templates for other interfaces of node "r9" may be instantiated in a similar manner. The following is an automatically generated configuration file for node r9:

```
router ospf
    router-id 0.0.0.9
    interface swp1
        ip ospf area 0.0.0.0
    interface swp2
        ip ospf area 0.0.0.0
    interface swp3
        ip ospf area 0.0.0.0
    interface swp4
        ip ospf area 0.0.0.0
```

Automatically generated BGP and OSPF routing configuration files for nodes r1, r3 and r9 are summarized in FIG. 5. Such routing configuration files are examples of routing configuration file 20 generated by routing configuration file generator 18. Routing configuration files for nodes r2, r4, r5, r6, r7 and r8 are automatically generated in a similar fashion and will not be described in detail.

It is noted that the above-described interface templates have certain advantages as compared to the neighbor specification currently used in BGP. Today, BGP neighbors are specified in the configuration with peering addresses. As the network scales, managing and configuring the peering addresses can be quite cumbersome and error-prone. In the above-described interface templates, neighbors are specified as interfaces, which can yield a significant operational advantage. In one embodiment of the invention, the routing configuration file generator 18 discovers the peering address for each interface through neighbor addresses 16 and notifies the connected clients.

It is also noted that the above-described templates for originating interface prefixes also have certain advantages to the BGP configuration currently used for originating connected prefixes. Today, a BGP configuration for originating connected prefixes involves a 'network' statement as follows:
    network 10.1.1.0/24
This can again become cumbersome as the number of servers and hosts attached to a node increases. Additionally, when links flap (i.e., link alternate between an up and down state) taking an entire subnet down, BGP does not react by withdrawing the prefixes. This leads to blackhole events.

As described above, an extension to the network statement is used so that interfaces can be used instead.
    network interface <host-any>
Note, this statement will trigger BGP to advertise the subnet of the interface, not the host (local) address.

Returning to FIG. 1, another input to the routing configuration file generator 18 is routing protocol 14. Such input was already described in connection with the DOT file depicted in FIG. 2, and specifies the type of routing configuration file that is to be generated by routing configuration file generator 18, whether it may be BGP, OSPF, EIGRP, etc. In an alternative embodiment, the routing protocol may be specified separately from the DOT file.

Another input to the routing configuration file generator 18 is neighbor addresses 16. Some routing protocols require the IP addresses of node neighbors (i.e., directly connected neighbors of a node) to be specified in the routing configuration file. In one embodiment of the invention, link local addresses are assigned to node neighbors, eliminating the need to acquire the IP addresses of the node neighbors. Link local addresses are, in many cases, generated automatically based on the media access control (MAC) address of a node and a well-defined prefix fe80:.

As a specific example, link local addresses may be utilized in a BGP configuration file. As is known, the following BGP command is used to start a TCP connection:

```
router bgp <ASx>
    neighbor <address> remote-as <ASy>
``` where <address> is a placeholder for the remote peer's L3/IP address, <ASx> is a placeholder for Autonomous System X and <ASy> is a placeholder for Autonomous System Y.

One way of acquiring the remote peer's L3/IP address is to discover the remote peer's link local address. In one embodiment of the invention, link-local addresses (discovered via the well known IPv6 neighbor discovery protocols) are used for BGP peering (i.e., link-local address is substituted in place of the <address> placeholder).

Figure 6:
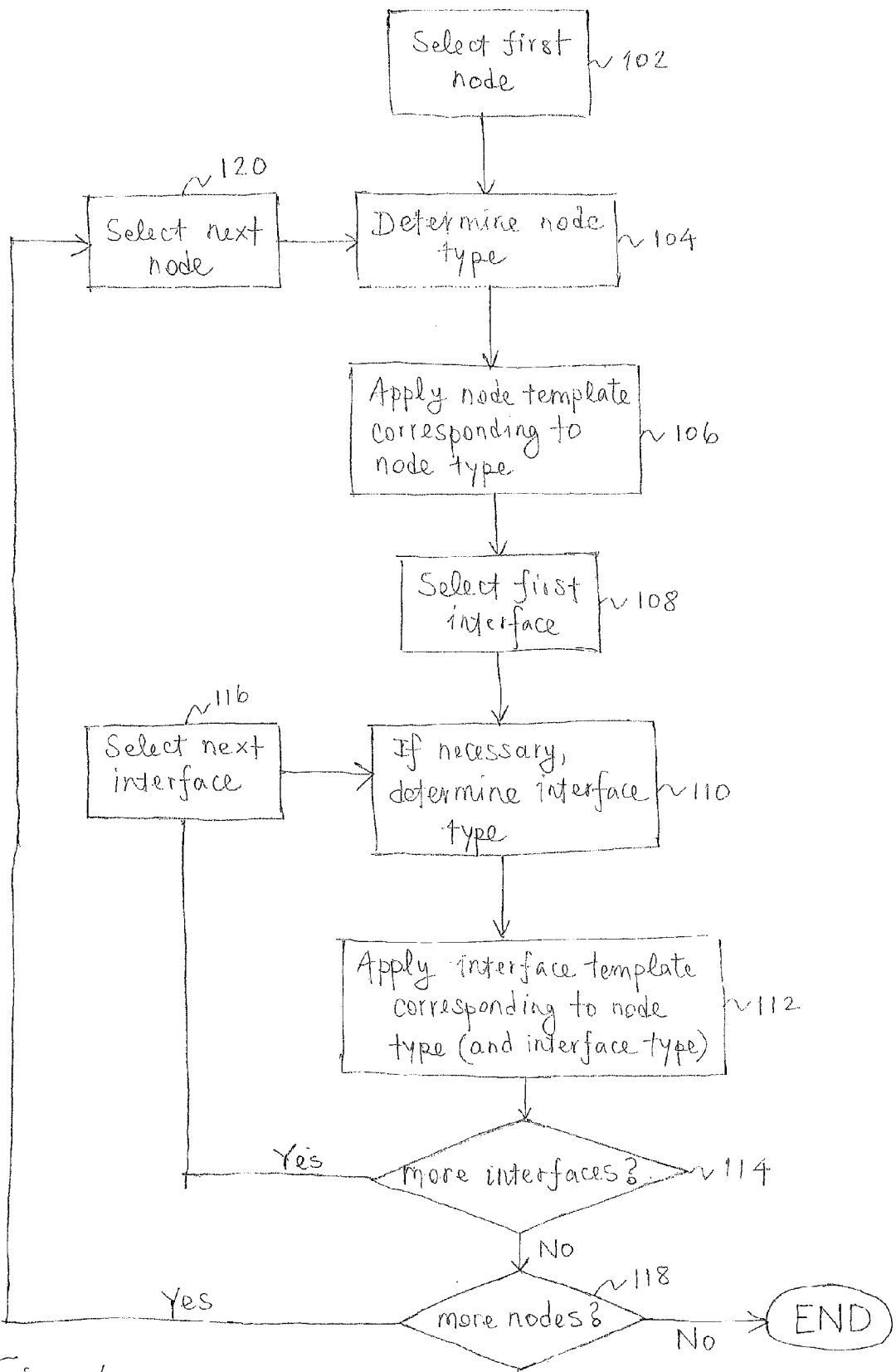
FIG. 6 depicts a flow diagram that may be performed by the routing configuration file generator, in accordance with one embodiment of the invention.

FIG. 6 depicts a flow chart of an algorithm performed by routing configuration file generator 18, in accordance with one embodiment of the invention. In step 102, a first node of the network topology is selected. In step 104, the node type of the first node is determined, exemplary node types including "leaf" nodes, "midsp" nodes and "topsp" nodes. In step 106, the node template corresponding to the node type is applied or instantiated. In step 108, a first interface of the first node is selected. In step 110, an interface type of the first interface is determined, if necessary. Exemplary interface types include <leaf-layer> or <to-leaf>, indicating that the interface is communicatively coupled to a leaf node; <spine-layer> indicating that the interface is communicatively coupled to a spine node;

and <to-top-spine> indicating that the interface is communicatively coupled to a top spine node. In some instances, no interface type is determined.

In step 112, the interface template corresponding to the node type (and optionally an interface type, if determined in step 110) is applied or instantiated. In step 114, it is determined whether the first node has additional interfaces. If the first node has additional interfaces, the next interface is selected at step 116, and the routine is repeated from step 110. If the first node does not have additional interfaces, it is determined in step 118 whether there are additional nodes in the network topology that have not been processed. If so, the next node is selected in step 120, and the routine is repeated from step 104. If not, the routine terminates.

Figure 7:
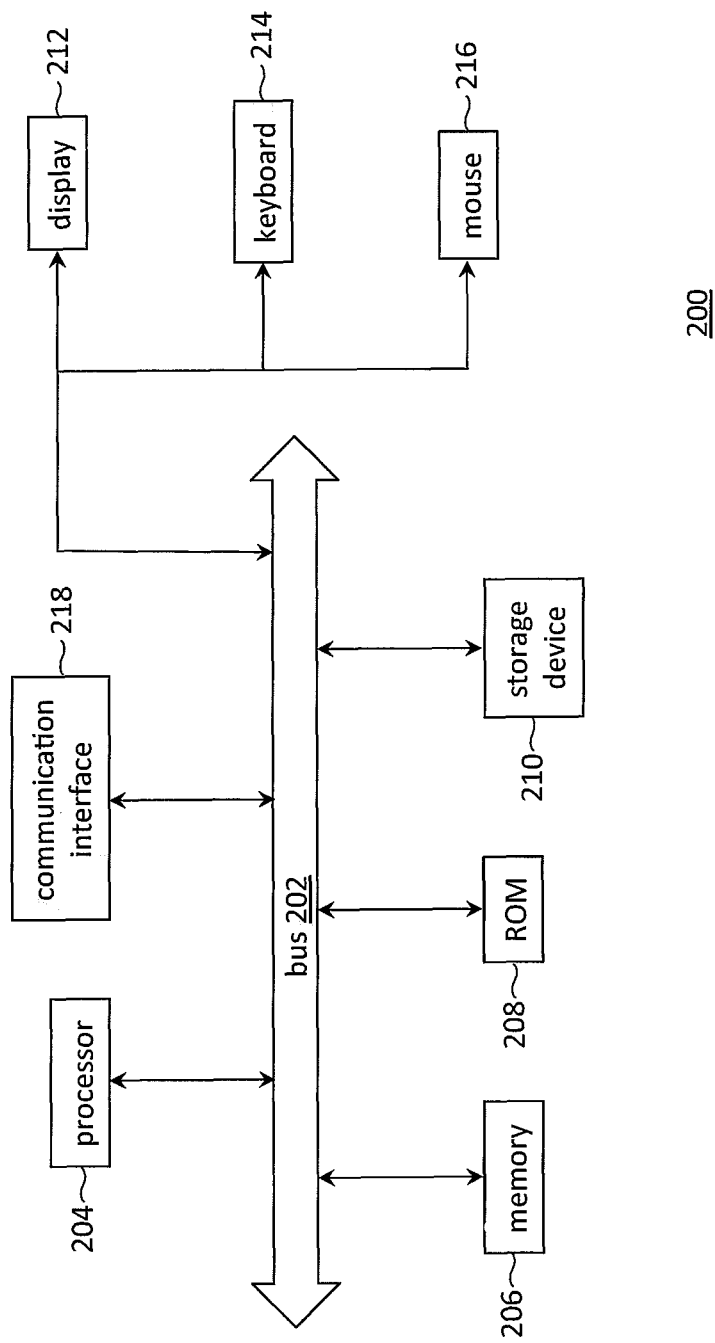
FIG. 7 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 7 provides an example of a computer system 200 that is representative of any of the nodes, network devices, intermediary devices, switches, bridges, routers, gateways and firewalls discussed herein. Note, not all of the various computer systems may have all of the features of computer system 200. For example, certain of the computer systems discussed above may not include a display inasmuch as the display function may be provided by a client computer communicatively coupled to the computer system or a display function may be unnecessary. Such details are not critical to the present invention.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, may be coupled to the bus 202 for communicating information and command selections to the processor 204. Another type of user input device is cursor control device 216, such as a mouse, a trackball, or cursor direction keys for communicating direction information and command selections to processor 204 and for controlling cursor movement on the display 212. Other user interface devices, such as microphones, speakers, etc. are not shown in detail, but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units (e.g., field programmable gate arrays) may be used in place of or in combination with processor 204 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 provides a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet.

Thus, methods and systems for automatically generating routing configuration files based on a network topology and a collection of routing configuration templates have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for automatically generating a configuration file for each node of a network, each node including at least one interface, the method comprising:
   receiving, at a configuration file generator, information indicative of a topology of the network, the network topology specifying an interconnection of the interfaces of the nodes of the network; and
   for each respective node in the network, the configuration file generator:
      determining a node type of the respective node from the network topology; and generating a routing configuration file for the respective node by:
applying a node template corresponding to the determined node type by populating the node template with at least some of the information indicative of the topology of the network; and
applying an interface template corresponding to the determined node type and a node type of an adjacent node by populating the interface template with at least some of the information indicative of the topology of the network, wherein the node type of the adjacent node is one of a leaf node and a spine node.

2. The method of claim 1, wherein each node is a router, a bridge, a gateway, a firewall or a switch.

3. The method of claim 1, wherein the network topology is specified using one or more of a graph description language and a graph modeling language.

4. The method of claim 1, wherein the network topology further specifies the node type for each of the nodes.

5. The method of claim 1, wherein the network topology further specifies a node identifier for each of the nodes.

6. The method of claim 1, wherein the network topology further specifies an interface identifier for each interface of the nodes.

7. The method of claim 1, wherein the node type includes one or more of a leaf node and a spine node.

8. The method of claim 1, wherein the network topology is one or more of a Clos topology, a folded Clos topology, and a leaf and spine network.

9. The method of claim 1, further comprising receiving a network routing protocol, the network routing protocol including one or more of the Routing Information Protocol (RIP), the Enhanced Interior Gateway Routing Protocol (EIGRP), the Open Shortest Path First (OSPF) protocol, the Intermediate System to Intermediate System (IS-IS) protocol and the Border Gateway Protocol (BGP).

10. The method of claim 9, wherein the applied node template further corresponds to the determined node type and the received network routing protocol.

11. The method of claim 9, wherein the applied interface template further corresponds to the determined node type and the received network routing protocol.

12. The method of claim 1, wherein the automatically generated configuration file is one or more of a Routing Information Protocol (RIP) configuration file, an Enhanced Interior Gateway Routing Protocol (EIGRP) configuration file, an Open Shortest Path First (OSPF) configuration file, an Intermediate System to Intermediate System (IS-IS) configuration file and a Border Gateway Protocol (BGP) configuration file.

13. The method of claim 1, further comprising, for each node in the network, specifying neighbors as interfaces.

14. The method of claim 1, further comprising originating connected prefixes using interfaces.

15. A system for automatically generating a configuration file for each node of a network, each node including at least one interface, the system comprising:
a processor;
a storage device connected to the processor; and
a set of instructions on the storage device that, when executed by the processor, cause the processor to:
receive information indicative of a topology of the network, the network topology specifying an interconnection of the interfaces of the nodes of the network; and
for each respective node in the network:
determine a node type of the respective node from the network topology; and
generate a routing configuration file for the respective node by:
applying a node template corresponding to the determined node type by populating the node template with at least some of the information indicative of the topology of the network; and
applying an interface template corresponding to the determined node type and a node type of an adjacent node by populating the interface template with at least some of the information indicative of the topology of the network, wherein the node type of the adjacent node is one of a leaf node and a spine node.

16. A non-transitory machine-readable storage medium for automatically generating a configuration file for each node of a network, each node including at least one interface, the non-transitory machine-readable storage medium comprising software instructions that, when executed by a processor, cause the processor to:
receive information indicative of a topology of the network, the network topology specifying an interconnection of the interfaces of the nodes of the network; and
for each respective node in the network:
determine a node type of the respective node from the network topology; and
generate a routing configuration file for the respective node by:
applying a node template corresponding to the determined node type by populating the node template with at least some of the information indicative of the topology of the network; and
applying an interface template corresponding to the determined node type and a node type of an adjacent node by populating the interface template with at least some of the information indicative of the topology of the network, wherein the node type of the adjacent node is one of a leaf node and a spine node.

\* \* \* \* \*